(12) United States Patent
Lu et al.

(10) Patent No.: US 10,830,297 B2
(45) Date of Patent: Nov. 10, 2020

(54) HIGH PERFORMANCE CARBON FIBER

(71) Applicant: Goodrich Corporation, Charlotte, NC (US)

(72) Inventors: Weiming Lu, Akron, OH (US); Philip Sheehan, Pueblo West, CO (US); Modesto Martinez, III, Pueblo, CO (US); John Linck, Pueblo, CO (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/201,435

(22) Filed: Nov. 27, 2018

(65) Prior Publication Data
US 2019/0093718 A1    Mar. 28, 2019

Related U.S. Application Data

(62) Division of application No. 14/699,886, filed on Apr. 29, 2015, now Pat. No. 10,167,913.

(51) Int. Cl.
| F16D 65/12 | (2006.01) |
| C04B 35/83 | (2006.01) |
| F16D 69/02 | (2006.01) |
| F16D 55/24 | (2006.01) |

(52) U.S. Cl.
CPC ............ *F16D 65/126* (2013.01); *C04B 35/83* (2013.01); *F16D 55/24* (2013.01); *F16D 69/023* (2013.01)

(58) Field of Classification Search
CPC ........ F16D 55/24; F16D 65/126; F16D 69/02; F16D 69/023; F16D 2069/008; F16D 2200/0052; C04B 35/83
See application file for complete search history.

(56) References Cited

U.S. PATENT DOCUMENTS

| 3,657,410 | A | | 4/1972 | Tadao |
| 3,666,417 | A | | 5/1972 | Tadashi |
| 4,357,389 | A | | 11/1982 | Satoh |
| 5,383,963 | A | | 1/1995 | Kobayashi et al. |
| 5,525,558 | A | | 6/1996 | Niwa |
| 5,566,792 | A | * | 10/1996 | Yamamoto ............ F16D 69/023 188/218 XL |
| 5,908,792 | A | | 6/1999 | Sheehan et al. |
| 6,237,203 | B1 | | 5/2001 | Sheehan et al. |
| 6,638,883 | B2 | | 10/2003 | Gaffney |
| 7,063,870 | B2 | | 6/2006 | La Forest |
| 7,198,739 | B2 | | 4/2007 | La Forest |

(Continued)

FOREIGN PATENT DOCUMENTS

| CN | 101787504 | 7/2010 |
| CN | 102153361 | 8/2011 |

(Continued)

OTHER PUBLICATIONS

USPTO; Restriction Requirement Office Action dated Sep. 6, 2016 in U.S. Appl. No. 14/699,886.

(Continued)

*Primary Examiner* — Thomas W Irvin
(74) *Attorney, Agent, or Firm* — Snell & Wilmer, L.L.P.

(57) ABSTRACT

A system is disclosed comprising a carbon/carbon brake disk comprising a carbon fiber having a crystal orientation (CO) between 80% and 100% and a coefficient of friction of more than 0.183 in response to a rejected takeoff condition.

2 Claims, 5 Drawing Sheets

(56) References Cited

U.S. PATENT DOCUMENTS

| | | | |
|---|---|---|---|
| 7,754,323 | B2 | 7/2010 | Murai |
| 7,976,943 | B2 | 7/2011 | Chitrangad |
| 2005/0266203 | A1 | 12/2005 | La Forest |
| 2006/0177663 | A1 | 8/2006 | Simpson |
| 2010/0084075 | A1 | 4/2010 | Rutten |
| 2013/0224479 | A1 | 8/2013 | Aonuma |
| 2014/0132947 | A1 | 5/2014 | Fraunhofer-Gesellschaft |
| 2014/0342144 | A1 | 11/2014 | Nakayama |
| 2017/0102043 | A1 | 4/2017 | Opalka |
| 2018/0118901 | A1 | 5/2018 | Harper |

FOREIGN PATENT DOCUMENTS

| | | |
|---|---|---|
| CN | 103009497 | 4/2013 |
| CN | 103975003 | 8/2014 |
| EP | 710779 B1 | 3/2000 |
| JP | S50101770 | 8/1975 |
| WO | 2006127002 | 11/2006 |

OTHER PUBLICATIONS

USPTO; Pre-Interview First Office Action dated Nov. 24, 2017 in U.S. Appl. No. 14/699,886.

USPTO; Non-Final Office Action dated Jan. 30, 2018 in U.S. Appl. No. 14/699,886.

USPTO; Final Office Action dated Aug. 15, 2018 in U.S. Appl. No. 14/699,886.

USPTO; Notice of Allowance dated Nov. 1, 2018 in U.S. Appl. No. 14/699,886.

National Intellectual Property Administration, P. R. China, Chinese Search Report dated Jan. 18, 2019 in Application No. 201680024795.7.

National Intellectual Property Administration, P. R. China, Chinese Office Action dated Jan. 29, 2019 in Application No. 201680024795.7.

European Patent Office, European Office Action dated Apr. 3, 2019 in Application No. 16723573.8.

National Intellectual Property Administration, P.R. China, Second Chinese Office Action dated Oct. 16, 2019 in Application No. 201680024795.7.

European Patent Office, European Office Action dated Jan. 9, 2020 in Application No. 16723573.8.

National Intellectual Property Administration, P.R. China, Third Chinese Office Action dated Apr. 27, 2020 in Application No. 201680024795.7.

National Intellectual Property Administration, P.R. China, Chinese Search Report dated Apr. 20, 2020 in Application No. 201680024795.7.

\* cited by examiner

HIGH PERFORMANCE CARBON FIBER

CROSS REFERENCE TO RELATED APPLICATIONS

This application is a divisional of, claims priority to and the benefit of, U.S. Ser. No. 14/699,886, filed Apr. 29, 2015 and entitled "HIGH PERFORMANCE CARBON FIBER," which is hereby incorporated by reference in its entirety.

BACKGROUND

A rejected takeoff (RTO) condition may refer to a condition wherein an aircraft applies braking during takeoff in response to a pilot aborting takeoff. A large amount of torque is applied at the aircraft brakes during an RTO condition, causing a large amount of heat to be produced and, in turn, causing an increase in temperature. It is important that this increase in temperature experienced during an RTO condition does not create an undesirably large drop in the coefficient of friction of carbon/carbon (C/C) brake disks in the aircraft braking system.

SUMMARY

According to various embodiments, a system is disclosed comprising a carbon/carbon brake disk comprising a carbon fiber having a crystal orientation (CO) between 80% and 100% and a coefficient of friction of more than 0.183 in response to a rejected takeoff condition.

According to various embodiments, a method is disclosed comprising a method manufacturing of a carbon/carbon brake disk comprising forming a fibrous network from an oxidized carbon fiber precursor, carbonizing the oxidized carbon fiber precursor by heating the oxidized carbon fiber precursor to form a carbon fiber, wherein the carbon fiber has a crystal orientation (CO) between 80% and 100% and a coefficient of friction of more than 0.183 in response to a rejected takeoff condition.

According to various embodiments, a method of improving rejected takeoff (RTO) performance comprising manufacturing a first densified preform using a first manufacturing process, the first manufacturing process being free of a crystal orientation (CO) improvement process, manufacturing a second densified preform using a second manufacturing process, the second manufacturing process being the same as the first manufacturing process except the second manufacturing process includes the crystal orientation (CO) improvement process, measuring a first coefficient of friction in an RTO condition of the first densified preform, and measuring a second coefficient of friction in the RTO condition of the second densified preform, wherein the second coefficient of friction is greater than the first coefficient of friction.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Carbon/carbon parts ("C/C") in the form of friction disks (also referred to as a carbon/carbon brake disks) are commonly used for aircraft brake disks, race car brakes, and clutch disks. Carbon/carbon brake disks are especially useful in these applications because of the superior high temperature characteristics of C/C material. In particular, the carbon/carbon material used in C/C parts is a good conductor of heat and is able to dissipate heat generated during braking away from the braking surfaces. Carbon/carbon material is also highly resistant to heat damage, and thus, is capable of sustaining friction between brake surfaces during severe braking without a significant reduction in the friction coefficient or mechanical failure.

One method of manufacturing C/C materials involves fabrication of an oxidized polyacrylonitrile (PAN) or carbon fiber preform, followed by carbonization and chemical vapor infiltration (CVI) densification. The CVI cycles are continued, in conjunction with machining the preform between infiltration cycles if desired, until the desired part density is achieved.

Figure 3:
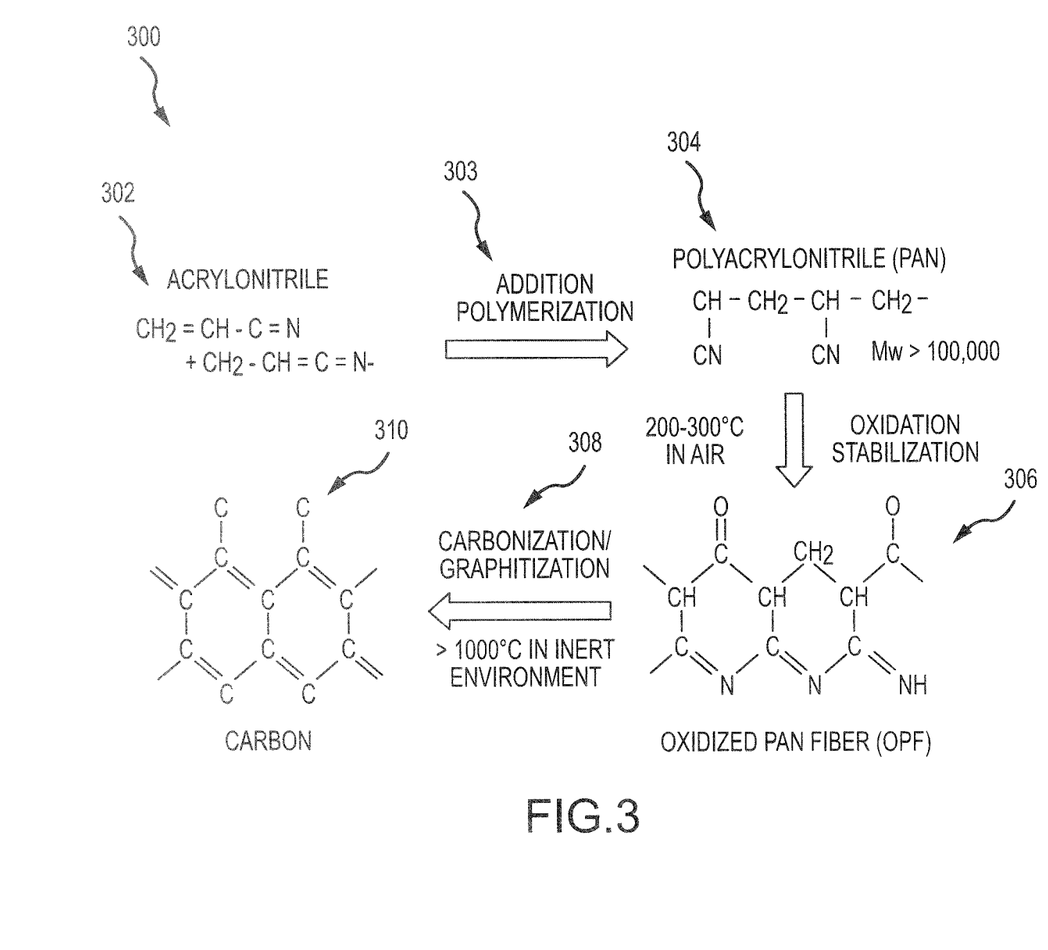
FIG. 3 is an illustration of the production of carbon fiber, in accordance with various embodiments.

With reference to FIG. 3, carbon fiber production lifecycle 300 is shown. Acrylonitrile 302 may be treated with addition polymerization 303 to produce PAN 304. PAN 304 may be oxidized via oxidation stabilization at between 200° C. and 400° C. (392° F. and 752° F.) to produce oxidized PAN fiber (OPF) 306. PAN 304 and OPF 306 may be referred to as a carbon fiber precursor. OPF 306 may undergo carbonization/graphitization 308 at 1,000° C. (1,832° F.) or more in an inert environment to form carbon fiber 310. Carbon fiber 310 may be structured as sheets of graphene.

In general, C/C parts produced using the OPF, carbonization, and CVI densification method are made in three successive manufacturing steps. First, a fibrous preform is made utilizing a variety of textile manufacturing techniques.

Typically, the fibrous preform is made from OPF or carbon fiber. Although numerous techniques are known in the art for making fibrous preforms from OPF, a common technique involves stacking layers of OPF to superimpose the layers. The added layers may then be needled perpendicularly to the layers with barbed textile needles. The needing process generates a series of z-fibers through the fibrous preform that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack is formed. The needles may also penetrate through only a portion of the preform or may penetrate through the entire preform. In addition, resins are sometimes added to the fibrous preform by either injecting the resin into the preform following construction or coating the fibers or layers prior to forming the fibrous preform. Fibrous preforms may also be made from pitch based carbon fiber tows and/or from lignin carbon fiber tows.

After the fibrous preform is made, it is carbonized to convert the OPF into carbon fibers, such as in carbonization/graphitization 308. Typically, fibrous preforms are carbonized by placing the preforms in a furnace with an inert atmosphere. As is well-understood by those in the art, the heat of the furnace causes a chemical conversion which drives off the non-carbon chemicals from the preform. Carbonization/graphitization 308 may be conducted in a vacuum or partial vacuum (e.g., at pressures of 1-10 millitorr) or in an inert atmosphere at a temperature in the range from about 1,400° C. to about 2,800° C. (2,552° F. to about 5,072° F.), and in various embodiments in the range from about 1,600° C. to about 2,200° C. (2,912° F. to about 3,992° F.), and in various embodiments in the range from about 1,600° C. to about 2,500° C. (2,912° F. to about 4,532° F.)(wherein the term about in this context only means +/−100° C.) for a period of time in the range of up to about 60 hours, and in various embodiments, in the range up to about 10 hours (wherein the term about in this context only means +/−2 hours). The resulting preform generally has the same fibrous structure as the fibrous preform before carbonizing. However, the OPF have been converted to 100% carbon or very near 100%, for example from 95% carbon to 99.9% carbon. The resulting preform may be referred to as having a fibrous network.

After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases (e.g., at least one of methane, ethane, propane, butane, and/or the like, as described herein) into the furnace and around and through the fibrous preforms. The hydrocarbons may comprise alkanes, for example, straight chain, branched chain and/or cyclic alkanes, having from 1 to about 8 carbon atoms, and in various embodiments from 1 to about 6 carbon atoms, and in various embodiments from 1 to about 3 carbon atoms. Methane, ethane, propane, cyclopentane, or mixtures of two or more thereof may be used. The gas may comprise one or more alkanes of 2 to about 8 carbon atoms, and in various embodiments from 2 to about 6 carbon atoms. Mixtures of one or more alkanes of 1 to about 8 carbon atoms with one or more alkenes of 2 to about 8 carbon atoms may be used. In various embodiments, fibrous preform may undergo an infiltration with a resin or pitch material to form a matrix therein.

As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon."

Figure 5:
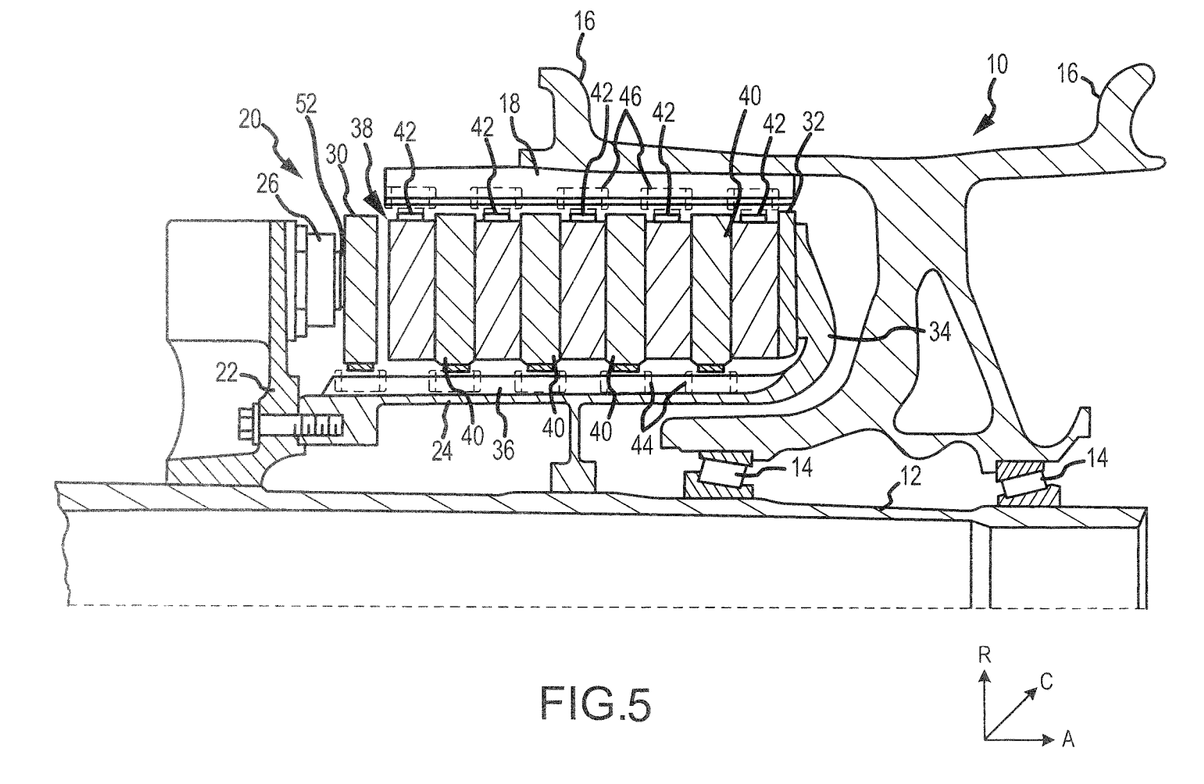
FIG. 5 illustrates a multi-disk brake, in accordance with various embodiments.

The resulting C/C part may thus be referred to as a C/C brake disk. A C/C brake disk may be used in an aircraft braking system. With reference to FIG. 5, an aircraft braking system, an in particular, multi-disk brake system 20 is illustrated. In various embodiments, multi-disk brake system 20 may be used to reduce the speed of a wheel of an aircraft. An A-R-C axis has been included in the drawings to illustrate the axial (A), radial (R) and circumferential (C) directions. The system may include a wheel 10 supported for rotation around axle 12 by bearings 14. Wheel 10 includes rims 16 for supporting a tire, and a series of axially extending rotor splines 18 (one shown). Rotation of wheel 10 is modulated by disk brake system 20. Disk brake system 20 includes torque flange 22, torque tube 24, a plurality of pistons 26 (one shown), pressure plate 30, and end plate 32. Torque tube 24 is an elongated annular structure that includes a reaction plate 34 and a series of axially extending stator splines 36 (one shown). Reaction plate 34 and stator splines 36 may be integral with torque tube 24 as shown in FIG. 5, or attached as separate components.

Disk brake system 20 also includes a plurality of friction disks 38, which may comprise C/C brake disks. The plurality of friction disks 38 includes at least one non-rotatable friction disk 40, also known as a stator, and at least one rotatable friction disk 42, also known as a rotor. Each friction disk 38 includes an attachment structure. As shown in FIG. 5, each of four non-rotatable friction disks 40 include a plurality of stator lugs 44 at circumferentially spaced positions around non-rotatable friction disk 40 as an attachment structure. Similarly, each of five rotatable friction disks 42 include a plurality of rotor lugs 46 at circumferentially spaced positions around rotatable friction disk 42 as an attachment structure. As shown in FIG. 5, pressure plate 30, end plate 32, and friction disks 38 are all annular structures made at least partially from a carbon composite material (i.e., a C/C material, which may be referred to as a C/C brake disk).

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 support pressure plate 30 so that pressure plate 30 is also non-rotatable. Stator splines 36 also support non-rotatable friction disks 40. Non-rotatable friction disks 40 engage stator splines 36 with gaps formed between stator lugs 44. Similarly, rotatable friction disks 42 engage rotor splines 18 with gaps formed between rotor lugs 46. Thus, rotatable friction disks 42 are rotatable by virtue of their engagement with rotor splines 18 of wheel 10.

As shown in FIG. 5, rotatable friction disks 42 are arranged with end plate 32 on one end, pressure plate 30 on the other end, and non-rotatable friction disks 40 interleaved so that rotatable friction disks 42 are adjacent to non-rotatable friction components. Pistons 26 are connected to torque flange 22 at circumferentially spaced positions around torque flange 22. Pistons 26 face axially toward wheel 10 and include pucks 52 that contact a side of pressure plate 30 opposite rotatable friction disks 42. Pistons 26 may be powered electrically, hydraulically or pneumatically.

An aircraft braking system, such as multi-disk brake system 20, may be used to slow an aircraft while the aircraft is on the ground, for example during landing. Typically, by regulation, aircraft braking systems are designed to withstand an RTO condition. An RTO condition may refer to a condition wherein an aircraft applies brakes during takeoff in response to a pilot aborting takeoff. An RTO condition may involve a fully laden aircraft (i.e., an aircraft carrying its maximum rated weight) without benefit of the use of thrust reversers. In that regard, an RTO condition may involve the application of a large amount of torque on the aircraft braking system. For example, during an RTO condition, multi-disk brake system 20 may exert over 1,000 lbs ft of torque and, in various embodiments, over 20,000 lbs ft of torque.

An RTO condition may be simulated using a dynamometer. An aircraft braking system, such as multi-disk brake system 20, may be mechanically coupled to a dynamometer. The dynamometer may simulate the speed of an aircraft wheel prior to an RTO under a load equivalent or nearly equivalent to an aircraft. The aircraft braking system may then be activated to exert a braking torque. During simulation, a coefficient of friction for a C/C brake disk (typically referred to as the Greek letter mu ($\mu$)), may be determined. As may be understood, as load and heat increases, the coefficient of friction tends to decrease in conventional systems.

The ability to maintain an acceptable coefficient of friction during an RTO condition may be a measure of RTO performance and it is important to aircraft braking system development. Thus, C/C brake disks with acceptable coefficients of friction under RTO conditions are desirable.

Figure 1:
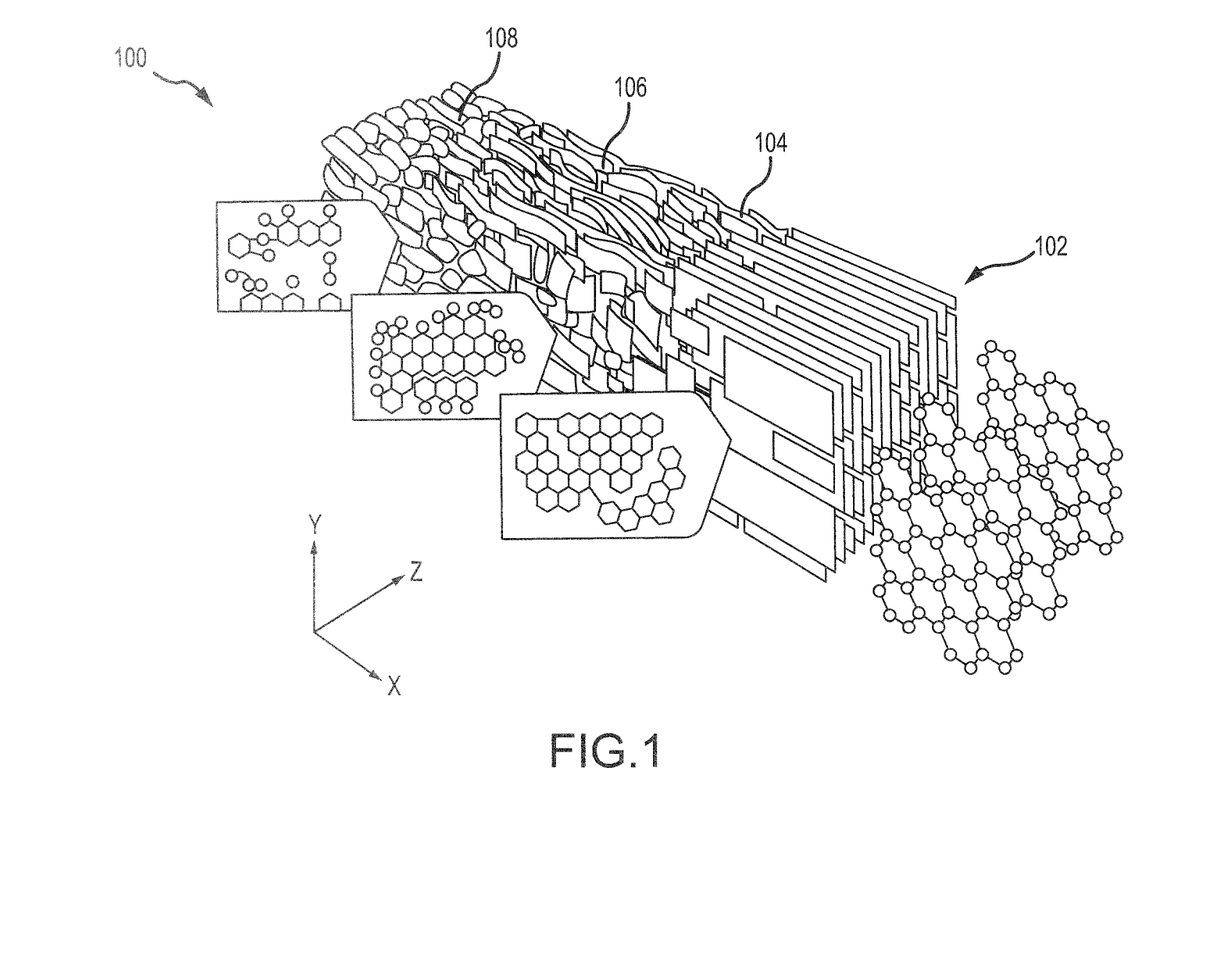
FIG. 1 is a schematic illustration of carbon fiber having various crystal orientations (CO), in accordance with various embodiments.

As discussed above, carbon fiber may be comprised of graphene sheets with varying levels of alignment about a given plane. With reference to FIG. 1, a carbon fiber 100 is shown in accordance with various embodiments with varying levels of alignment about the xy plane. Stated another way, carbon fiber 100 exhibits varying levels of alignment about the xy plane along the z direction. In a carbon fiber, the x direction may be the length of the carbon fiber. For example, if a carbon fiber is cylindrical in geometry, the x direction may be thought of as the axial direction. As an example of alignment, at point 102, the graphene sheets of carbon fiber 100 are aligned along with the xy plane and stacked in the z direction. However, at point 104, the graphene sheets tend to be disposed at a first angle relative to the xy plane along the z direction. At point 106, the graphene sheets tend to be disposed at a second angle relative to the xy plane along the z direction, the first angle being less than the second angle. At point 108, the graphene sheets tend to be disposed at a third angle relative to the xy plane along the z direction, the second angle being less than the third angle.

The degree of alignment with regard to a plane in a carbon fiber may be referred to as crystal orientation (CO). CO may be expressed as a percentage of graphene sheets in a given fiber that are aligned with the xy plane. At point 102, for example, CO is 100% in that all graphene sheets are aligned with the xy plane. At point 104, however CO may be only 90%, as a portion of the graphene sheets are aligned at the first angle with the xy plane. At point 106, however CO may be 70% and at point 108, CO may be 40%.

Figure 2:
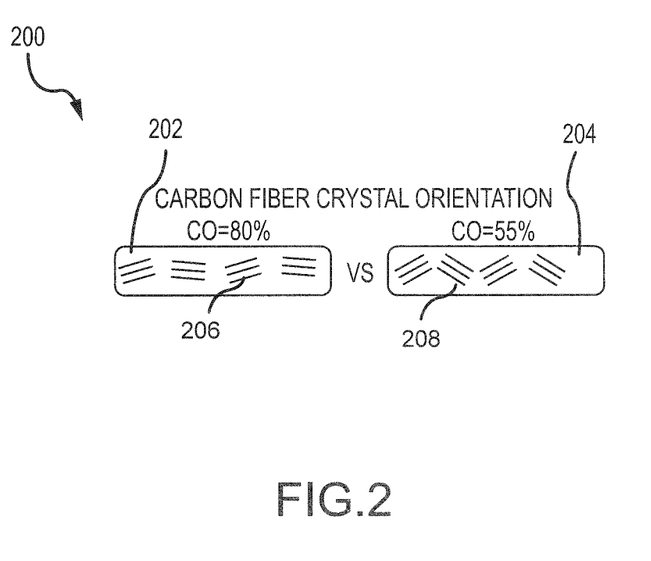
FIG. 2 is a schematic illustration of carbon fiber having various CO, in accordance with various embodiments.

With reference to FIG. 2, exemplary CO illustration 200 is shown for two samples of carbon fiber. Sample 202 illustrates graphene sheets 206. Sample 202 has a CO of 80%. Sample 204 illustrates graphene sheets 208. Sample 204 has a CO of 55%. In that regard, graphene sheets 206 of sample 202 have a higher degree of alignment with respect to a plane (here, the horizontal plane) than graphene sheets 208 of sample 204.

The present inventors have discovered that carbon fibers having a high level of CO exhibit enhanced RTO performance. Stated another way, carbon fibers having a high level CO, once densified into a C/C brake disk, exhibit larger coefficients of friction under an RTO condition than carbon fibers having a lower level CO. As used herein, a high level of CO may be from 80% to 100%, 82% to 100%, from 87% to 100%, from 87% to 98%, from 87% to 95%, from 88% to 95%, and from 90% to 99%. Moreover, the present inventors have discovered that performing one or more CO improvement processes (as described herein) during or after the manufacture of PAN fibers or OPF fibers may improve the level of CO in the resultant carbon fibers, which would exhibit enhanced RTO performance relative to the carbon fibers produced without the one or more CO improvement processes. Stated another way, a conventional PAN fiber or OPF fiber manufacturing process may be improved by increasing the level of CO in the resultant carbon fibers. For example, a conventional PAN fiber or OPF fiber manufacturing process may lead to carbon fibers having a CO of 58%. The PAN fiber or OPF fiber manufacturing process may be improved by adding one or more CO improvement processes. The resulting carbon fibers may have a CO of 65% or higher.

CO may be measured using wide angle X ray diffraction (wide angle XRD or WAXD). Wide angle XRD may be used to examine the crystalline structure of polymers. Generally, wide angle XRD may comprise projecting X rays at a target and observing the diffraction patterns that occur as a result. For example, d spacing may be discerned using wide angle XRD. D spacing may be defined as the spacing between planes of a crystalline structure. For example, with momentary reference to FIG. 1, d spacing may be thought of as the spacing in the z direction of the graphene sheets.

Figure 4:
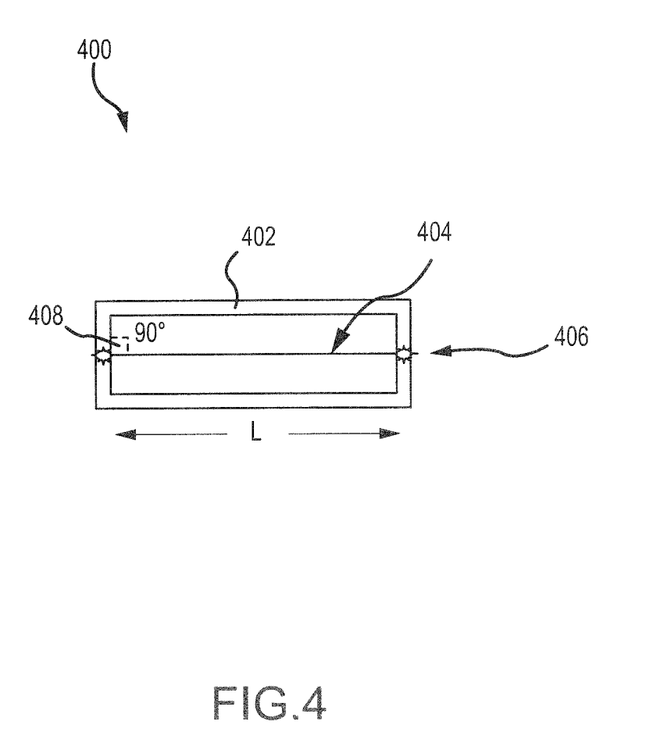
FIG. 4 is an illustration of a wide angle X ray diffraction rig, in accordance with various embodiments.

For example, with reference to FIG. 4, rig 400 in accordance with various embodiments is shown for use with wide angle XRD. Support card 402 is provided as a support for carbon fiber 404. Support card 402 may comprise any suitable stiff structure that is compatible with wide angle XRD. For example, support card 402 may comprise heavy duty paper, cardboard, construction paper, or other stiff paper product. Support card 402 may be take any suitable geometry, for example, support card 402 may be circular, square, rectangular, or the like. Support card 402 as shown in FIG. 4 is rectangular.

Carbon fiber 404 may be secured to support card 402. As shown, carbon fiber 404 is disposed across the length (L) of support card 402. In various embodiments, L is between 10 mm and 40 mm. Carbon fiber 404 is anchored, for example, at point 406 and is pulled taught so that carbon fiber 404 is at right angle 408 to support card 402. Carbon fiber 404 may be attached to support card 402 in any suitable manner. For example, in various embodiments, carbon fiber 404 may be glued, stapled, tied, taped, or otherwise fastened to support card 402.

Support card 402 may be placed proximate an X ray source. X rays may be projected at support card 402 from the X ray source. A sensor, film, or other recording media may capture the X ray diffraction patterns for analysis. The CO of carbon fiber 404 may be determined from the X ray diffraction patterns. For example, the X ray diffraction patterns obtained during testing of carbon fiber 404 may be compared to other known reference values. For example, the WAXD patterns generated by graphite may be used to compare to the X ray diffraction patterns obtained during testing of carbon fiber 404. In that regard, the differences between the reference graphite and carbon fiber 404 may be used to calculate CO.

For example, two-dimensional wide angle X-ray diffraction (2D WAXD) experiments were conducted on a RIGAKUA 18 kW rotating anode X-ray generator using Cu Ka radiation in the wavelength of 0.1542 nm. The X-ray beam shoot is perpendicular to fiber length direction. A R-AXIS-IV image plate system was used as a detector. The exposure time to obtain suitable patterns was 20 minutes to 40 minutes for each test. The peak positions were calibrated using silicon crystals. A two dimensional pattern was integrated into a one dimensional powder pattern. The angle scan range is about 2 degrees to 60 degrees.

To determine CO, the Hermans uniaxial orientation function may be used. The Hermans uniaxial orientation function specifies an average orientation of the vector $r_j$ with respect to a reference axis z in terms of the angle $\phi_{jz}$. The function may be represented as:

$$f = (3 < \cos^2 \phi_{jz} > -1)/2$$

In that regard, f=1 corresponds to perfect orientation in the $\phi$=0 direction and f=0 corresponds to random orientation. If the orientation function is calculated for an orthogonal axis, $f_a + f_b + f_c = 0$.

For a given crystalline plane (hkl), the evaluation of $<\cos^2 \phi_{hkl,z}>$ with respect to the reference axis z can be carried out by the following equations:

$$< \cos^2 \phi_{hkl,z} > = \frac{\int_0^{\pi/2} I(\phi) \sin\phi \cos^2\phi \, d\phi}{\int_0^{\pi/2} I(\phi) \sin\phi \, d\phi}$$

Conventional analysis may yield high testing variations. However, by using the process described herein, the variations across samples decreases. Thus, one may now more reliably detect fiber differences.

Samples 1, 2, 3 and 4 in TABLE 1 represent four different C/C brake disks. Each sample had its CO assessed via wide angle XRD as described herein. Each sample was then formed into a preform and densified via CVI, as described herein. The CVI technique performed on each sample was identical or nearly identical. Each sample was then subjected to an RTO condition simulation on a dynamometer. Each sample was subjected to the same RTO condition test in that testing parameters such as applied torque load, etc., were identical and/or substantial identical. TABLE 1 contains the CO value and coefficient of friction for each sample, normalized to account for textile differences. As shown, the coefficient of friction under an RTO condition is shown to be related to CO value.

TABLE 1

| Sample | CO Value | Avg RTO |
|---|---|---|
| Sample 1 | 88 | 0.183 |
| Sample 2 | 80 | 0.159 |
| Sample 3 | 62 | 0.132 |
| Sample 4 | 55 | 0.120 |

As described herein, increasing CO of a carbon fiber is beneficial to a C/C brake disk. In that regard, several approaches may be used in carbon fiber production to improve CO. In various embodiments, a CO improvement process may comprise any process performed on a carbon fiber and/or carbon fiber precursor prior to carbonization that tends to improve CO. For example, a CO improvement process may comprise methods to increase polymer isotacticity content, methods of adjusting fiber stretching during spinning, fiber washing, drying, oxidation and/or carbonization and reducing polymer molecular weight distribution. In various embodiments, a CO improvement process comprising at least one of melt spinning, air gap spinning, or wet jet spinning may be used in carbon fiber production. In melt spinning, a feed material may be processed through a barrel heater and fed to a gear pump. The gear pump may supply a die that extrudes a carbon fiber precursor fiber. In air gap spinning, a tow of carbon fiber precursor fiber may be spun in a solvent bath. In wet jet spinning, a tow of carbon fiber precursor fiber may be spun in a solvent bath, fed through a spinneret and jet stretched. A carbon fiber precursor fiber may also be formed by catalyst supported vapor growth. Catalyst supported vapor growth involves catalyst-mediated carbon fiber precursor fiber growth. In various embodiments, a CO improvement process may comprise performing carbonization (such as carbonization/graphitization 308, discussed above) at 1,600° C. to about 2,500° C. (2,912=F to about 4,532° F.)(wherein the term about in this context only means +/−100=C).

In various embodiments, a first CO improvement process and a second CO improvement process may be performed on a carbon fiber precursor. In that regard, one or more CO improvement processes may be used during manufacture of a carbon fiber precursor. In this manner, a carbon fiber precursor may experience an improved CO. By performing first CO improvement process and a second CO improvement process, the CO of a carbon fiber produced from the carbon fiber precursor may improve. In that regard, a carbon fiber precursor may be made in a given manufacturing process (e.g., a manufacturing process that is free of a CO improvement process) to have, for example, a 55% CO after carbonization. However, one or more CO improvement processes may be added to the given manufacturing process which may improve CO by 5% or more.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   manufacturing a first densified preform manufactured using a first manufacturing process, the first manufacturing process being free of a fiber crystal orientation (CO) improvement process;
   manufacturing a second densified preform manufactured using a second manufacturing process, the second manufacturing process being the same as the first manufacturing process except the second manufacturing process includes a first fiber CO improvement process and a second fiber CO improvement process;
   measuring a first coefficient of friction in a rejected takeoff (RTO) condition of the first densified preform; and
   measuring a second coefficient of friction in the RTO condition of the second densified preform;
   wherein the second coefficient of friction in the RTO condition of the second densified preform is greater than the first coefficient of friction in the RTO condition of the first densified preform, in response to the fiber CO improvement process,
   the first fiber CO improvement process comprises at least one of melt spinning, air gap spinning, and wet jet spinning, and
   the second fiber CO improvement process comprises at least one of melt spinning, air gap spinning, and wet jet spinning.

2. The method of claim 1, wherein the fiber CO improvement process comprises alignment of graphene sheet of a carbon fiber with regard to a plane.

* * * * *